United States Patent [19]

Mae et al.

[11] Patent Number: 4,681,627
[45] Date of Patent: Jul. 21, 1987

[54] PROCESS FOR PREPARING AN INGOT FROM METAL SCRAP

[75] Inventors: Yoshiharu Mae, Urawa; Tsutomu Oka, Omiya, both of Japan

[73] Assignee: Mitsubishi Kinzoku Kabushiki Kaisha, Tokyo, Japan

[21] Appl. No.: 868,120

[22] Filed: May 27, 1986

[30] Foreign Application Priority Data

| Jun. 3, 1985 | [JP] | Japan | 60-120157 |
| Jun. 3, 1985 | [JP] | Japan | 60-120158 |
| Jun. 3, 1985 | [JP] | Japan | 60-120159 |
| Aug. 23, 1985 | [JP] | Japan | 60-185404 |

[51] Int. Cl.$^4$ .............................................. C22B 4/00
[52] U.S. Cl. ................................. 75/10.19; 75/65 EB
[58] Field of Search ............ 75/65 EB, 65 ZM, 10.19, 75/445

[56] References Cited

U.S. PATENT DOCUMENTS

| 2,753,262 | 7/1956 | Herres et al. | 75/226 |
| 2,867,895 | 1/1959 | Howell et al. | 29/184 |
| 2,898,672 | 8/1959 | Howell | 29/184 |
| 3,773,499 | 11/1973 | Melnikov | 75/65 ZM |
| 4,130,416 | 12/1978 | Zaboronok | 75/65 EB |
| 4,190,404 | 2/1980 | Drs et al. | 164/50 |

FOREIGN PATENT DOCUMENTS 1219099 1/1971 United Kingdom .
2049513 12/1980 United Kingdom .

*Primary Examiner*—Peter D. Rosenberg
*Attorney, Agent, or Firm*—Frishauf, Holtz, Goodman & Woodward

[57] ABSTRACT

A process for producing an ingot from molten metal scrap, particularly scrap consisting of refractory metals such as titanium, zirconium and alloys thereof, comprises changing ungraded metal scrap into a tubular member with a closed end which is made of the same material as that of the metal scrap; melting the scrap-charged tubular member by heating which an electron beam or plasma electron beam, with said member being held substantially horizontally in a vacuum melting furnace. Alternatively, a pair of consumable electrodes which are made of such scrap-charged tubular members are melted with an arc produced between the tips of the tubular members which serve as electrodes. Since the metal scrap need not be graded according to size, the range of scrap charges that can be melted for ingot making is expanded. If the tubular member is replaced by a box with an open top, the scrap can be packed easily and uniformly. This provides improved melting efficiency and a greater ease of melting operations since, in vacuum melting with an electron beam or plasma electron beam, a constant melting rate is attained and, in arc melting using one or more pairs of the scrap-charged boxes as consumable electrodes, a consistent arc can be maintained between the tips of each of the two scrap-charged boxes which serve as electrodes.

30 Claims, 4 Drawing Figures

PROCESS FOR PREPARING AN INGOT FROM METAL SCRAP

FIELD OF THE INVENTION

The present invention relates to a process for preparing an ingot from metal scrap, particularly scrap consisting of refractory metals such as titanium, zirconium and alloys thereof, either by melting in a vacuum melting furnace with an electron beam or a plasma electron beam, or by melting in an arc melting furnace using consumable electrodes formed of the metal scrap.

BACKGROUND OF THE INVENTION

Two methods are chiefly employed today to prepare ingots from molten scrap of refractory metals such as titanium, zirconium and alloys thereof. In one method, scrap in the form of cuttings or small lumps is supplied into the hearth of a vacuum melting furnace and is caused to melt by application of a electron beam or plasma electron beam, and the molten puddle in the hearth is transferred into a water-cooled mold and the solidified casting withdrawn from the bottom of the mold. The second method employs arc melting with a consumable electrode formed of the metal scrap which is suspended in a water-cooled copper crucible. A d.c. arc is produced between the tip of the electrode and the seed melt in the crucible, and as the electrode is gradually melted, it drops into the crucible and builds up on its bottom. The molten pool is solidified from the bottom upward into an ingot.

These methods, however, have various problems. In the first method using an electron beam or plasma electron beam in a vacuum melting furnace the scrap must be graded according to size. In addition, this method is capable of handling only scrap of small size ranging from cuttings to small lumps and much time is required to obtain scrap which is uniform in size. In short, the first method is disadvantageous in that it is capable of handling only a limited range of scrap. In the second method which depends on arc melting using a consumable electrode, the process of electrode fabrication must be changed according to the size of scrap and this requires the scrap to be graded. Scrap in the form of cuttings or small lumps requires the additional step of pressing, and lumps of a medium size must be cut to smaller sizes prior to pressing. Therefore, a lot of steps and time are involved in the fabrication of a consumable electrode.

The present inventors therefore made concerted efforts to solve the aforementioned problems and found that such problems can be eliminated by one of the following methods. In one method, unsorted metal scrap of various sizes is charged into a tubular member with a closed end which is made of the same material as that of the metal scrap, and this tubular member while being held horizontally in a vacuum melting furnace is melted with a electron beam or plasma electron beam. In the other method, two tubular members filled with the metal scrap are used as a pair of consumable electrodes which are positioned in a face-to-face relationship in such a manner that an arc is produced between the tips of the electrodes to melt the metal scrap in the tubes.

The present inventors continued their studies and obtained the following additional observations:

(1) If, instead of the tubular member, use is made of a box with its top open which has a shape such a that formed by cutting a tube of a polygonal cross section in the axial direction, metal scrap can be easily charged into the box from the top. The state in which scrap is packed in the box can be visually inspected and the scrap can be charged at will into an part of the box such that uniform and dense packing is attained with great ease. Additional advantages of using the box with its top open are that the box can be fabricated with less material than is required in making a tube and that considerable reduction in the manufacturing cost is realized.

(2) If the material of the box is not the same as that of the metal scrap to be charged thereinto, the impurities will change the final composition of the ingot formed from a molten mixture of the scrap and the box. However, if the resulting variation in the composition of the ingot is within tolerable limits, the box does not need to be formed of a material which is completely identical to that of the metal scrap, provided that said box material contains at least one of the components which are present in the metal scrap.

SUMMARY OF THE INVENTION

The present invention has been accomplished on the basis of the aforementioned findings. In one aspect, the invention relates to a process for producing an ingot from metal scrap by first melting the scrap in a vacuum melting furnace or a consumable-electrode type arc melting furnace, and then solidifying the melt in a water-cooled mold into an ingot: wherein (1) the metal scrap is charged into a tubular member with a closed end which is made of the same material as that of the scrap, and said tubular member is heated with an electron beam or plasma electron beam from said closed end toward the other end, with said tubular member being held horizontally in a vacuum melting furnace, and subsequently the resulting melt is caused to drop into the water-cooled mold where it is solidified; or (2) the metal scrap is charged into two tubular members each having a closed end which is made of the same material as that of the scrap, an arc is produced between the closed ends of said two tubular members serving as consumable electrodes which are held horizontally in an arc melting furnace, and the resulting melt is caused to drop into the water-cooled mold where it is solidified; provided that in (1) or (2) the melt may be temporarily held within a hearth before overflowing into the mold.

In another aspect, the present invention relates to a process for producing an ingot from metal scrap by first melting the scrap in a vacuum melting furnace or a consumable-electrode type arc melting furnace, and then solidifying the melt in a water-cooled mold into an ingot: wherein (1) the metal scrap is charged into a box with its top open, said box containing at least one of the components present in said metal scrap, said box having a shape such as that which is formed by cutting a tubular member of a polygonal cross section in the axial direction, said box having a holding member at one or both ends thereof or having no such holding member at either end, said box is heated with an electron beam or plasma electron beam from one end thereof toward the other end, with said box being held horizontally in a vacuum melting furnace, and subsequently the resulting melt is caused to drop into the water-cooled mold where it is solidified; or (2) the metal scrap is charged into two or more pairs of boxes having the characteristics defined in (1), an arc is produced between the ends of each of the two boxes serving as consumable electrodes which are held horizontally in an arc melting furnace, and subsequently the resulting melt is caused to drop into the water-cooled mold where it is solidified; provided that in (1) or (2) the melt may be temporarily held within a hearth before overflowing into said water-cooled mold.

BRIEF DESCRIPTION OF THE DRAWINGS

FIGS. 1 to 3 are side views illustrating the ingot formation embodying the essence of the present invention, in which FIGS. 1 and 2 show the operation of the vacuum melting process using an electron beam or plasma electron beam as a heating source, and FIG. 3 shows the operation of the arc melting method using two consumable electrodes.

DETAILED DESCRIPTION OF THE INVENTION

Figure 1:
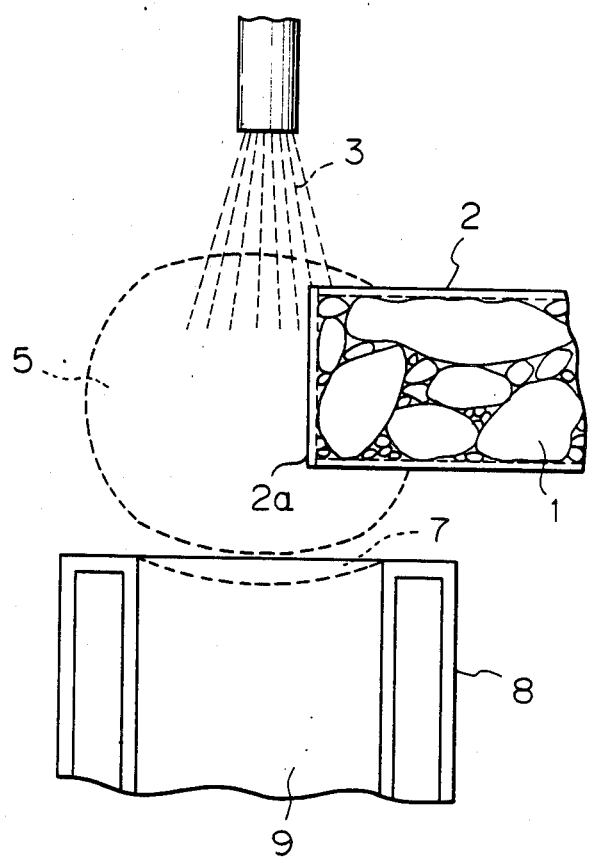

As illustrated in FIG. 1 which shows the making of an ingot from metal scrap by the vacuum melting process incorporating the concept of the present invention, unsorted scrap 1 of various sizes is charged into a tubular member 2 having a closed end 2a; while being held horizontally over a water-cooled mold 8 in a vacuum melting furnace, the tube is caused to advance incrementally into a zone 5 where high temperatures prevail as a result of heating with an electron beam or plasma electron beam 3; the metal scrap 1 is melted together with the tube 2 and the resulting melt drops into the mold 8 forming a molten pool 7 in the upper part of the mold, while the melt is solidified in the lower part of the mold to form an ingot 9.

Figure 2:
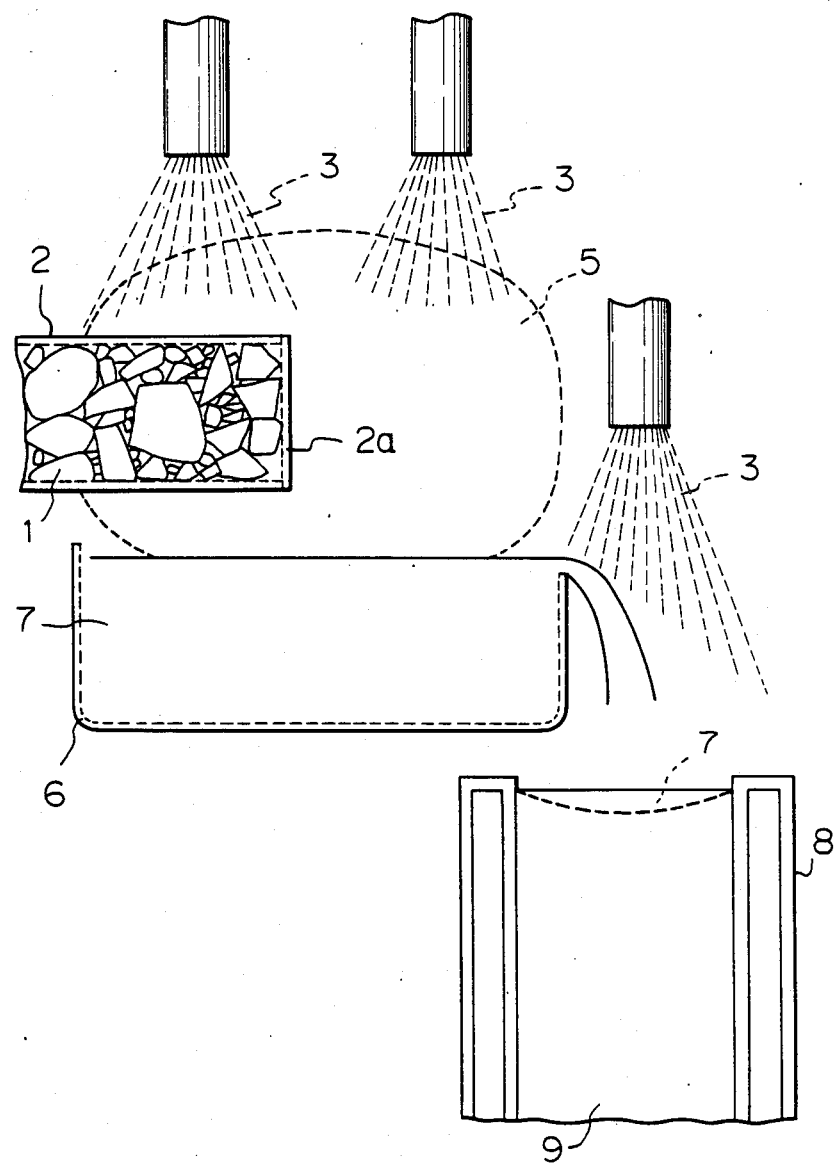

FIG. 2 shows an embodiment wherein the melt of scrap and tube is temporarily held within a hearth before the supernatant thereof overflows into the water-cooled mold. Stated more specifically, the metal scrap 1 which has melted together with the tube 2 drops into a hearth 6 where a molten pool 7 forms and the supernatant of the pool 7 is allowed to continuously overflow from the hearth 6 into the water-cooled mold 8. Again, a molten pool 7 forms in the upper part of the mold 8 while the melt in the lower part of the mold is cooled to solidify into an ingot 9. The method shown in FIG. 2 is effective for the purpose of making an ingot which is free from tungsten carbide or any other of the heavy impurities initially present in the scrap 1.

Figure 3:
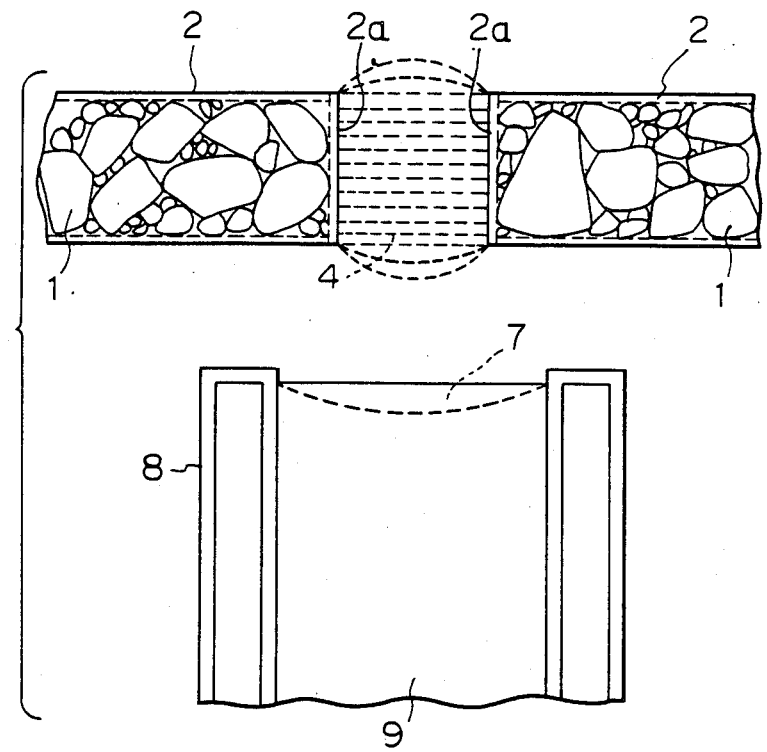

FIG. 3 is a sketch of ingot fabrication by the arc melting process employing consumable electrodes formed of the tubular member described in connection with FIGS. 1 and 2. Tubular members 2 packed with scrap 1 are positioned side by side in such a manner that their closed ends 2a face each other. The tubes serving as consumable electrodes are arranged horizontally over a water-cooled mold such as a water-cooled copper mold 8, and an arc 4 is struck between the tips of the electrodes. The metal scrap 1 in the electrodes is melted together with the tubes 2 and drops into the mold 8 forming a molten pool 7 in the upper part of the mold, while the melt 7 in the lower part of the mold is cooled to solidify into an ingot 9.

The tubular member may have any cross-sectional shape but a circular or rectangular cross section is preferable. The tubular member is closed at either one or both ends for the purpose of preventing spillage of the scrap at any time during the interval between each charging operation and the melting of the scrap in the furnace. The tubular member may be closed with any member that is capable of attaining this purpose. If, for example, the size of the scrap is fairly large, the closing member may be perforated to provide a net or grid or, alternatively, it may be provided with slits. The closing member is usually provided at one end of the tubular member but, if necessary, it may be provided at both ends of the tube.

After the closing member of the tube is melted, some of the scrap in the tube which is yet to be melted may drop into the molten pool forming at the upper part of the water-cooled mold although this is a very rare occurrence. However, the scrap which may drop is comparatively small in size and will readily melt in the molten pool being heated with an electron beam, plasma electron beam or a hot arc.

In order to attain a higher production rate, more than one scrap-filled tubular member may be fed into the heating zone 5 simultaneously. For the same reason, two or more pairs of scrap-filled tubular members may be used as consumable electrodes in arc melting.

In accordance with another aspect of the present invention, a box with an top open is substituted for the tubular member with a closed end as a member which is to be packed with metal scrap.

1. Material of the box

The scrap-charged box will melt together with the metal scrap and enters the bulk of the finally obtained ingot, thereby causing variations in its quality. In order to avoid this problem completely, the box is most preferably made of the same material as that of the scrap. However, in the actual ingot-making operation the scrap charge sometimes consists of a mixture of two or more slightly different compositions, and some variation is allowed for the composition of the product ingot. In view of these facts, the material of the box need not be completely identical to that of the scrap so long as the variation introduced into the composition of the ingot by the entrance of unmelted box is not outside the limits required of the composition of the ingot. In other words, if the variation caused by entrance of the unmelted box is within the permissible range for the composition of the ingot, it suffices that the box contains at least one of the components initially present in the metal scrap.

The box may have any cross-sectional shape that is equivalent to a polygon with one or more sides thereof taken away. Usually, a box having a U-shaped cross section as shown by 11 in FIG. 4 is preferably used because it is easy to fabricate and handle.

Figure 4:
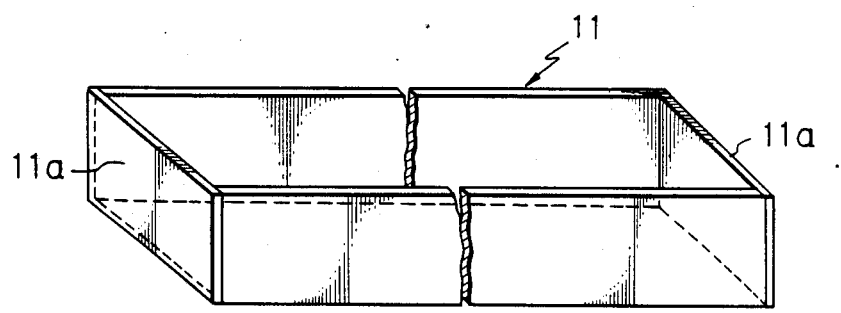
FIG. 4 is a perspective view showing an example of the box that may be used in the present invention.

The box is provided with a retaining member, either at one end or at both ends thereof as shown by 11a in FIG. 4, for the purpose of preventing spillage of the scrap at any time during the interval between each charging operation and the melting of the scrap in the furnace. The retaining member may be of any type that is capable of attaining this purpose. A plate is typically employed but if the size of the scrap is fairly large, the plate may be perforated to provide a net or grid or, alternatively, it may be provided with slits. If there is no possibility of the spillage of scrap, the retaining member may be provided only at one end of the box or it may be eliminated entirely.

The box may be fabricated by any method but usually is made by welding hot-rolled and descaled metal plates into a desired shape. This assembling method is advantageous in that the box may be fabricated from metal plates which are not as wide as are necessary for fabricating a round pipe. The box has the additional advantage that it could be fabricated without employing hot rolling or other hot treatments that require strict temperature control.

2. Ingot making

The methods described in connection with FIGS. 1 to 3 may be employed in making an ingot from metal scrap using the box with its top open instead of a tubular member as a scrap holder.

If there is no possibility of the scrap slipping or rolling down out of the box during melting operations, the box may be positioned in any fashion, and the term "horizontal" used in this specification is taken to mean not only the completely horizontal position but also "a generally horizontal" posture.

In order to attain a higher productivity, more than one box may be supplied into the heating zone 5 simultaneously, or more than one pair of boxes may be positioned side by side in such a manner that an arc 4 is produced between the tips of each of the two electrodes.

The methods of the present invention are advantageously used in making ingots from scrap of refractory metals such as titanium, zirconium and alloys thereof. However, it should be understood that they are applicable to scrap of any other metals that are suitable for treatment either by vacuum melting using an electron beam or plasma electron beam or by arc melting with consumable electrodes.

The present invention is hereunder described with reference to the following examples.

EXAMPLE 1

A pipe (Ti-6% Al-4% V) with one end closed was provided; it measured 60 mm square, 1,200 mm long and 1 mm thick. The pipe was filled with scrap of a titanium alloy having the same composition as the pipe; the scrap consisted of chips ranging in size from 10 mm to 40 mm square. The total weight of the scrap-charged pipe was 10.4 kg, and the scrap fill ratio was 53%. The pipe was placed horizontally in a plasma beam melting furnace as shown in FIG. 1; the pipe was irradiated with a plasma electron beam under vacuum (0.01 mmHg) to make a cylindrical ingot (115 mm$^\phi$ × 220 mm$^L$) at a plasma torch voltage of 35 volts and a torch current of 800 amperes, with the pipe advancing at a rate of 0.4 cm/min. The compositional analyses of the scrap charge and the product ingot are shown in Table 1.

TABLE 1

| | Composition (wt %) | | | | | | | | | |
|---|---|---|---|---|---|---|---|---|---|---|
| | Al | V | Fe | O | C | N | H | Y | others | Ti |
| Scrap Ingot | 6.24 | 4.03 | 0.171 | 0.145 | 0.005 | 0.006 | 0.007 | <0.003 | <0.40 | bal. |
| top | 6.20 | 4.10 | 0.175 | 0.150 | 0.006 | 0.007 | 0.002 | <0.003 | <0.40 | bal. |
| middle | 6.15 | 4.00 | 0.170 | 0.140 | 0.005 | 0.005 | 0.001 | <0.003 | <0.40 | bal. |
| bottom | 6.22 | 4.05 | 0.165 | 0.148 | 0.006 | 0.005 | 0.001 | <0.003 | <0.40 | bal. |

EXAMPLE 2

A pipe having the same alloy composition and dimensions as specified in Example 1 was provided. The pipe was filled with scrap of a titanium alloy having the same composition as the pipe; the scrap was a mixture of various sizes ranging from cuttings of chips of 40 mm square. The total weight of the scrap-charged pipe was 9.9 kg and the scrap fill ratio was 51%. The pipe was placed horizontally in a plasma beam melting furnace with two plasma torches as shown in FIG. 2. The pipe was irradiated with a plasma electron beam under vacuum (0.01 mmHg) to make a molten pool in the hearth at a plasma torch voltage of 36 volts and a torch current of 500 amperes, with the pipe advancing at a rate of 0.35 cm/min. The melt overflowed the hearth into a water-cooled copper mold where it was cooled to solidify into a cylindrical ingot (115 mm$^\phi$ × 200 mm$^L$). The compositional analyses of the scrap charge and the product ingot are shown in Table 2.

The ingot (ca. 9.5 kg) formed from the pipe and scrap whose weight totalled approximately 10 kg contained no tungsten carbide deriving from cutting tools. On the other hand, the residue in the hearth was found to contain two tungsten carbide chips which were probably fragments of cutting tools.

TABLE 2

| | Composition (wt %) | | | | | | | | | |
|---|---|---|---|---|---|---|---|---|---|---|
| | Al | V | Fe | O | C | N | H | Y | others | Ti |
| Scrap Ingot | 6.24 | 4.03 | 0.171 | 0.145 | 0.005 | 0.006 | 0.007 | <0.003 | <0.40 | bal. |
| top | 6.21 | 4.11 | 0.175 | 0.140 | 0.004 | 0.005 | 0.001 | <0.003 | <0.40 | bal. |
| middle | 6.18 | 4.05 | 0.168 | 0.142 | 0.004 | 0.006 | 0.001 | <0.003 | <0.40 | bal. |
| bottom | 6.14 | 3.98 | 0.168 | 0.141 | 0.003 | 0.004 | 0.001 | <0.003 | <0.40 | bal. |

EXAMPLE 3

Two pipes having the same alloy composition and dimensions as specified in Example 1 were provided. Each pipe was filled with scrap of a titanium alloy having the same composition as the pipe. The scrap consisted of chips ranging in size from 10 mm to 400 mm square. The total weight of each scrap-filled pipe was 11.3 kg and the scrap fill ratio was 58%. The two pipes were arranged side by side in an arc melting furnace such that their closed ends faced each other as shown in FIG. 3. The arc was produced between the tips of these consumable electrodes under vacuum (2 × 10$^{-3}$ mmHg) at a voltage of 40 volts and a current of 2,000 amperes; and a cylindrical ingot (115 mm$^\phi$ × 400 mm$^L$) was made from the molten electrodes. The compositional analyses of the scrap charge and the product ingot are shown in Table 3.

TABLE 3

| | Composition (wt %) | | | | | | | | | |
|---|---|---|---|---|---|---|---|---|---|---|
| | Al | V | Fe | O | C | N | H | Y | others | Ti |
| Scrap | 6.24 | 4.03 | 0.171 | 0.145 | 0.005 | 0.006 | 0.007 | <0.003 | <0.40 | bal. |
| Ingot | | | | | | | | | | |
| top | 6.22 | 4.00 | 0.170 | 0.150 | 0.006 | 0.005 | 0.001 | <0.003 | <0.40 | bal. |
| middle | 6.19 | 3.98 | 0.178 | 0.148 | 0.004 | 0.004 | 0.001 | <0.003 | <0.40 | bal. |
| bottom | 6.18 | 4.05 | 0.174 | 0.145 | 0.003 | 0.004 | 0.001 | <0.003 | <0.40 | bal. |

EXAMPLE 4

A pure titanium box having the shape shown in FIG. 4 and being closed at both ends was provided. The box of commercial pure titanium measured 350 mm wide, 600 mm high, 2,400 mm long and 3 mm in plate thickness, and weighed 54 kg. The box was charged with scrap of titanium alloy (Ti-6% Al-4% V) which was a mixture of various sizes ranging from 5 mm square to the dimensions of ca. 150 mm×150 mm×400 mm (35 kg in weight). The total weight of the scrap was 1,600 kg and the fill ratio was 74%. The box was placed horizontally in a plasma beam melting furance as shown in FIG. 1, and irradiated with a plasma electron beam under vacuum (0.01 mmHg) to make a cylindrical ingot (440 mm$^\phi$×2,100 mm$^L$; ca. 1.4 tons in weight) at a plasma output of 500 kW, with the box advancing at a rate of 2 cm/min.

In the operation described above, the titanium scrap could be packed uniformly in the box at a high fill ratio. Therefore, the scrap and the box could be melted at a constant rate, with the attendant advantages of easy control of the melting operation, a reduction in its period and less power consumption.

The compositional analyses of the scrap charge and the product ingot are summarized in Table 4.

using the hearth, and this method is effective in reducing power consumption.

The tubular member may be replaced by a box with its top open, and the use of this box allows the scrap to be packed easily and evenly while retaining the advantages of using the tubular member. If the box is used in vacuum melting with an electron beam or plasma electron beam, a constant melting rate is attained; if one or more pairs of the boxes are employed as consumable electrodes in arc melting, a uniform and consistent arc can be produced between the tips of each of the two electrodes. In each method, the box permits a higher scrap filling ratio and provides improved melting efficiency and a greater ease of melting operations.

In the methods of the present invention, the scrap first melts in the tubular member or box, then drops into the water-cooled mold in the form of liquid globules, and the ingot obtained contains no portion of the scrap that remains undissolved. Therefore, the present invention allows a sound ingot to be made by a single melting operation, instead of two or three operations heretofore required in the prior art methods.

For the reasons stated above, the present invention offers industrially useful methods of producing ingots from metal scrap.

What is claimed is:

TABLE 4

| | Composition (wt %) | | | | | | | | | |
|---|---|---|---|---|---|---|---|---|---|---|
| | Al | V | Fe | O | C | N | H | Y | others | Ti |
| Scrap | 6.15–6.25 | 4.00–4.15 | 0.16–0.17 | 0.14–0.17 | 0.005–0.009 | 0.005–0.008 | 0.005–0.009 | <0.001 | <0.30 | bal. |
| Ingot | | | | | | | | | | |
| top | 6.17 | 4.02 | 0.155 | 0.15 | 0.007 | 0.005 | 0.001 | <0.001 | <0.30 | bal. |
| middle | 6.15 | 4.05 | 0.163 | 0.15 | 0.008 | 0.006 | 0.001 | <0.001 | <0.30 | bal. |
| bottom | 6.13 | 3.98 | 0.164 | 0.15 | 0.006 | 0.005 | 0.001 | <0.001 | <0.30 | bal. |

The scrap was diluted with the pure Ti box by only 3.4%, so that the composition of the finally obtained ingot was entirely free from the effects of the composition of box material.

A pipe with a closed end having the same dimensions as those of the box was provided and filled with scrap of the same size and compositional analysis as employed above. The scrap fill ratio was about 50%.

As will be understood from the foregoing description, the ingot-making process of the present invention which uses a tubular member as a scrap holder eliminates the need for grading the scrap according to size and enables the melting of scrap consisting of a mixture of widely varying sizes, thereby expanding the range of metal scrap charges from which an ingot can be made. If the melt of the scrap and the tubular member is held in a hearth temporarily before the supernatant thereof overflows into a water-cooled mold, an ingot free from tungsten carbide or any other heavy impurities can be obtained. If no such impurities are present in the scrap, the melt may be directly dropped into the mold without 1. A process for producing an ingot from metal scrap by first melting the scrap in a vacuum melting furnace and then solidifying the melt in a water-cooled mold into an ingot comprising:
   charging the metal scrap into a tubular member with a closed end and another end, said tubular member being made of the same material as that of the scrap;
   heating said tubular member with an electron beam or from said closed end toward the other end thereof to heat and melt said tubular member and said scrap charged into said tubular member to form a melt;
   said tubular member being held substantially horizontally in said vacuum melting furnace during said heating step; and a causing the resulting melt to drop into said water-cooled mold wherein it is solidified into an ingot.

2. The process of claim 1, wherein said metal scrap is made of titanium, zirconium or an alloy thereof.

3. The process of claim 1, wherein said tubular member is heated with a plasma electron beam.

4. The process of claim 1, comprising temporarily holding said melt within a hearth, and overflowing said melt from said hearth into said water-cooled mold.

5. The process of claim 4, comprising heating said hearth with said melt therein.

6. The process of claim 5, wherein said hearth is heated with an electron beam.

7. The process of claim 1, wherein said heating step comprises advancing said tubular member toward a heating zone of said electron beam during said heating of said tubular member.

8. The process of claim 7, wherein said advancing step comprises incrementally advancing said tubular member into said heating zone during said heating thereof.

9. A process for producing an ingot from metal scrap by first melting the scrap in a consumable-electrode type arc melting furnace and then solidifying the melt in a water-cooled mold into an ingot comprising:
  charging the metal scrap into at least one pair of tubular members each having a closed end and another end, said tubular members being made of the same material as that of the scrap;
  said at least one pair of tubular members being held substantially horizontally in said furnace and being arranged end-to-end with said closed ends facing each other and spaced apart from each other;
  producing an arc between said facing closed ends of said tubular members which serve as consumable electrodes in said furnace to heat and melt said tubular members and said scrap charged therein to form a melt; and
  causing the resulting melt to drop into said water-cooled mold wherein it is solidified into an ingot.

10. The process df claim 9, wherein said metal scrap is made of titanium, zirconium or an alloy thereof.

11. The process of claim 9, comprising temporarily holding said melt within a hearth, and overflowing said melt from said hearth into said water-cooled mold.

12. The process of claim 11, comprising heating said hearth with said melt therein.

13. The process of claim 9, comprising advancing said tubular members toward each other during said heating thereof by said arc.

14. A process for producing an ingot from metal scrap by first melting the scrap in a vacuum melting furnace and then solidifying the melt in a water-cooled mold into an ingot comprising:
  charging the metal scrap into a box with having an open top and at least two ends, said box containing at least one of the components present in said metal scrap, and said box having a shape such as that which is formed by cutting a tubular member of a polygonal cross section in the axial direction;
  . heating said box with an electron beam from an end thereof toward the other end thereof to heat and melt the box and the scrap charged into said box to form a melt;
  said box being held substantially horizontally in said vacuum melting furnace during said heating step; and
  causing the resulting melt to drop into said water-cooled mdold wherein it is solidified into an ingot.

15. The process of claim 14, wherein said metal scrap is made of titanium, zirconium or an alloy thereof.

16. The process of claim 14, wherein said box is heated with a plasma electron beam.

17. The process of claim 14, comprising temporarily holding said melt within a hearth, and overflowing said melt from said hearth into said water-cooled mold, 18. The process of claim 17, comprising heating said hearth with said melt therein.

19. The process of claim 14, wherein said box has a holding member at at least one of said ends thereof.

20. The process of claim 14, wherein said box has no holding member at any end thereof.

21. The process of claim 14, wherein said box has a generally U-shaped cross section.

22. The process of claim 14, wherein said heating step comprises advancing said box toward a heating zone of said electron beam during said heating of said box.

23. The process of claim 22, wherein said advancing step comprises incrementally advancing said box into said heating zone during said heating thereof.

24. A process for producing an ingot from metal scrap by first melting the scrap in a consumable-electrode type arc melting furnace and then solidifying the melt in a water-cooled mold into an ingot comprising:
  charging the metal scrap into at least one pair of boxes each having an open top and at least two ends said boxes containing at least one of the components present in said metal scrap, and said boxes each having a shape such as that which is formed by cutting a tubular member of a polygonal cross section in the axial direction;
  said at least one pair of boxes being held substantially horzontally in said furnace and being arranged end-to-end with ends thereof facing each other and spaced apart from each other;
  producing an arc between said facing ends of said boxes which serve as consumable electrodes in said furnace to heat and melt said boxes and said scrap charged therein to form a melt; and
  causing the resulting melt to drop into said water-cooled mold wherein it is solidified into an ingot.

25. The process of claim 24, said metal scrap is made of titanium, zirconium or an alloy thereof.

26. The process of claim 24, comprising temporarily holding said melt within a hearth, and overflowing said melt from said hearth into said water-cooled mold.

27. The process of claim 26, comprising heating said hearth with said melt therein.

28. The process df claim 24, comprising advancing said boxes toward each other during said heating thereof by said arc.

29. The process of claim 24, wherein said boxes have a holding member at at least one end thereof.

30. The process of claim 24, wherein said boxes each have a generally U-shaped cross section.

* * * * *

UNITED STATES PATENT AND TRADEMARK OFFICE
CERTIFICATE OF CORRECTION

PATENT NO. : 4,681,627
DATED : July 21, 1987
INVENTOR(S) : MAE et al

It is certified that error appears in the above-identified patent and that said Letters Patent is hereby corrected as shown below:

Title page, In The Abstract:

Line 8, "which" should read -- with --

Signed and Sealed this

Ninth Day of February, 1988

Attest:

DONALD J. QUIGG

Attesting Officer

Commissioner of Patents and Trademarks